United States Patent [19]
Ito

[11] 4,049,468
[45] Sept. 20, 1977

[54] SOLID ELECTROLYTE CELL
[75] Inventor: Yuzuru Ito, Sendai, Japan
[73] Assignee: Kabushiki Kaisha Daini Seikosha, Japan
[21] Appl. No.: 545,222
[22] Filed: Jan. 29, 1975
[30] Foreign Application Priority Data
Nov. 16, 1973 Japan .................... 48-129014
[51] Int. Cl.² .......................... H01M 13/00
[52] U.S. Cl. ................................ 429/193
[58] Field of Search .......... 136/83 R, 83 T, 6 R
[56] References Cited
U.S. PATENT DOCUMENTS

| | | | |
|---|---|---|---|
| 2,793,244 | 5/1957 | Van der Grinten | 136/111 |
| 3,736,186 | 5/1973 | Liang | 136/83 R |
| 3,769,089 | 10/1973 | Oomen | 136/83 R |
| 3,824,130 | 7/1974 | Liang | 136/137 |
| 3,909,296 | 9/1975 | Ito | 136/83 R |

Primary Examiner—John H. Mack
Assistant Examiner—C. F. LeFevour
Attorney, Agent, or Firm—Robert E. Burns; Emmanuel J. Lobato; Bruce L. Adams

[57] ABSTRACT

A solid electrolyte cell having $\beta$-alumina as the electrolyte is disclosed. The Cathodic active material is a compound having water of crystallization. The cathode is juxtaposed in contact with the surface of said $\beta$-alumina electrolyte, and a very small amount of an aqueous solution of inorganic acid is added to the contact areas. The discharge characteristics of the cells at low temperature is improved.

6 Claims, 2 Drawing Figures

SOLID ELECTROLYTE CELL

FIELD OF THE INVENTION

This invention relates to a solid electrolyte cells and more particularly to cells having β-alumina as the electrolyte.

BACKGROUND OF THE INVENTION

The solid electrolyte cells of the kind using β-alumina as the electrolyte have recently been proposed for use, because of their long shelf life, higher generating voltage per small area and relative freedom from leakage of the internal solvent. However such electrolyte cells have not been commercialized as they do not have sufficient efficiency at the room temperature.

Compounds having water of crystallization have been proposed for the cathodic active material to provide a stable discharge voltage. However, such cells exhibit a defect that the discharge voltage falls rapidly at low temperatures ranging from 0° C to −20° C.

SUMMARY OF THE INVENTION

The object of this invention is to provide a solid electrolyte cell which provides stable discharge currents not only at room temperature but at lower temperatures as well.

According to this invention, the pellet of cathode active material having water of crystallization is disposed in contact with the surface of the β-alumina solid electrolyte and a very small amount of an aqueous solution of an inorganic acid is interposed in the area of contact between the electrolyte and the pellet. As a result, stable, suitable discharge voltages are obtained at low temperatures in the range 0° C to −20° C. Additionally, the chemical reactions between the water of crystallization and sodium ions from the sodium metal anode are accelerated.

The foregoing object and other objects as well as the characteristic features of the invention will become more apparent and more readily understandable by the following description and from the appended claims.

DETAILED DESCRIPTION OF THE INVENTION

Figure 1:
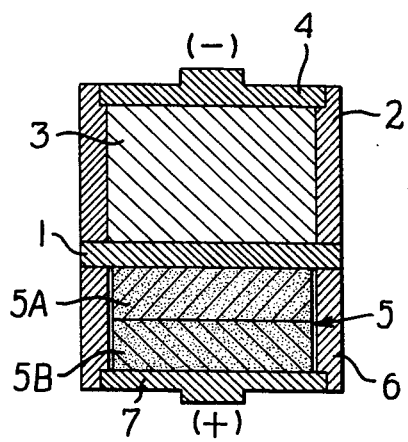
FIG. 1 shows a cross sectional view of the cell according to this invention.

FIG. 1, reference numeral 1 denotes the solid electrolyte β-alumina, and anode can 2 is adhered on it. Anode can 2 is filled with anodic active material 3, for example sodium metal, and the filled anode can 2 is sealed by anode cap 4 with adhesive or metal paste or by welding or solder.

The sodium anode material 3 is cut into proper size from a block of sodium. This filling of anode can 2 with sodium is done in a dry-box from which air is exhausted and replaced by dry argon gas of high purity.

Cathodic-active material 5 is preferably divided into two layers 5A and 5B. One layer is a mixture of cupric sulfatepentahydrate ($CuSO_4, 5H_2O$) and graphite in a weight ratio of 90:10, the other layer 5B is a mixture of cupric sulfate-trihydrate ($CuSO_4.3H_2O$) and graphite in a weight of ratio 80:10, and the former layer 5A is disposed in contact with the solid electrolyte layer 1 of β-alumina. The copper salts are available commercially in the powdered state. The cathode-active material may be either of the hydrated salts or an admixture thereof but the two discrete layers are preferred.

Cathode can 6 is adhered on the opposed side of β-alumina layer 1. After filling the cathode-active material 5A and 5B into the cathode can 6, the can is sealed with cathode cover 7 by means of an adhesive, a metal paste, welding or solder.

The powdered cathode-active materials, preferably, are each compressed into pellets of suitable size for fitting into the cathode can by press working at pressures of about 4ton/cm². For button cells as are commonly used for watches and instruments, the diameter of the pellet is 9mm, and the thickness is 2–3mm.

Before assembling, the cathode-active material pellet is abraded on the surface of the β-alumina solid electrolyte with which it will be contact and then a very small amount about 10μl (micro liters) of an aqueous solution of 50 percent sulfuric acid is suffused or dripped onto said surface to moisten it. The cathode pellet is then positioned juxtaposed to said electrolyte and sealed thereto.

Figure 2:
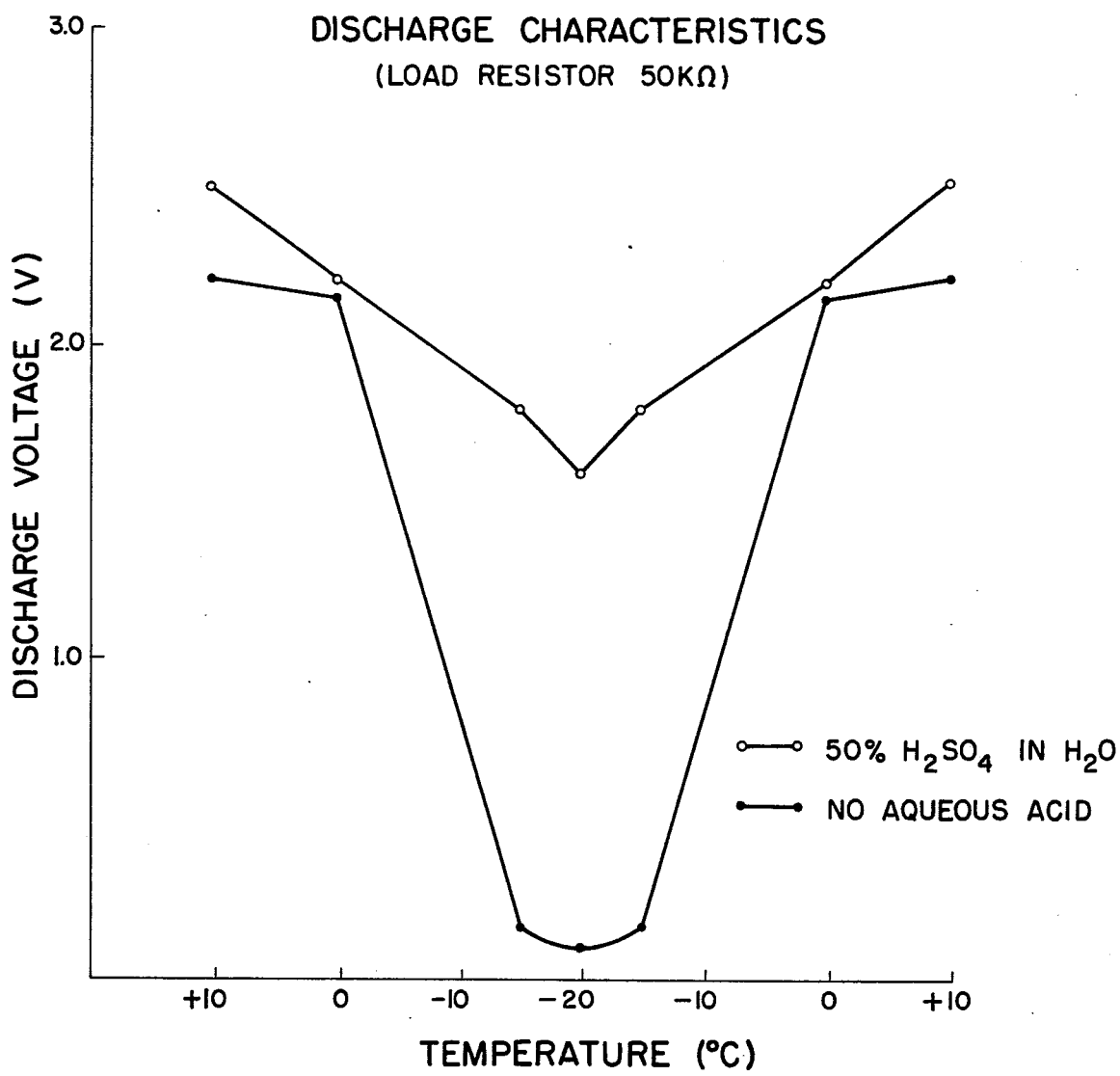
FIG. 2 shows discharge characteristics comparing a cell having no aqueous solution of inorganic acid with the cell according to this invention.

FIG. 2 shows the discharge characteristics with a 50KΩ load, resistor, comparing, at various temperatures, a cell having no solution of inorganic acid at the interface and the cell according to this invention.

The amount of aqueous acid added at the interface is not critical provided that it merely moistens the interfaces between the cathode and the solid electrolyte. Excess amounts which will substantially dissolve the cathodic material or will cause leakage and reaction with the metallic sodium anode should be avoided.

The cathode-active material is admixed with graphite, conductive carbon or another electrolytically inert conductive material such as powdered inert metal in order to improve the conductivity of said cathode material. As set forth above, it is preferred to maintain the highest ratio of cathodic active material adjacent to the electrolyte layer and more conductive materials closer to the electrode terminals which are electrode cans 2 and 6. Up to 50% of conductive material may be added. Additional suitable cathode active material for this invention and having water of crystallization include:

| Copper (cupric) compounds | |
|---|---|
| $CuCl_2 . 2H_2O$ | cupric chloride |
| $Cu(NO_3)_2 . 3H_2O$ | cupric nitrate |
| $Cu(C_2H_3O_2)2 . H_2O$ | cupric acetate |
| $CuC_2O_4 . \frac{1}{2}H_2O$ | cupric oxalate |
| $Cu(HCO_2)_2 . 4H_2O$ | cupric formate |
| Sodium compounds | |
| $Na_2CO_3 . 10 H_2O$ | sodium carbonate decahydrate |
| $Na_2WO_4 . 2H_2O$ | sodium O-tungstate |
| $Na_2SO_4 . 10 H_2O$ | sodium sulfate |
| $Na_3PO_4 . 12 H_2O$ | sodium O-phosphate |
| $NaBr . 2 H_2O$ | sodium bromate |
| Other suitable compounds | |
| $Li_2SO_4 . H_2O$ | lithium sulfate |
| $LiClO_4 . 3 H_2O$ | lithium perchlorate |
| $CaSO_4 . 2 H_2O$ | calcium sulfate |
| $BeSO_4 . 4 H_2O$ | beryllium sulfate |
| $NiSO_4 . 7 H_2O$ | nickel sulfate |
| $FeSO_4 . 7 H_2O$ | ferrous sulfate |

Among other inorganic acids suitable for wetting the interface between the solid electrolyte and the cathode active material are:

| | |
|---|---|
| $H_2SO_4$ | sulfuric acid |
| $H_3PO_4$ | O-phosphoric acid |
| $HNO_3$ | nitric acid |
| $H_3BO_3$ | O-boric acid |

The solid $\beta$-alumina electrolyte for this invention is made by a hot pressing technique. One method of preparing suitable $\beta$-alumina solid electrolyte elements includes the following steps:

Gamma-alumina or alpha-alumina is mixed with sodium aluminate ($NaAlO_2$) in methanol or other nonaqueous solvent for the aluminate. The ratio of the former and the later is about 78 weight percent to 22 weight percent. Then this mixture is ground into slurry. The diameter of the solid particles in the slurry is preferably less than three microns at this stage.

Above slurry is dried and is re-ground.

This re-ground material is pre-baked at the temperature of 1200°-1400° C for about 5 hours or more.

Then it is pulverized again in the air or in a non-aqueous liquid medium such as methanol and then dried.

This dried material is heated to a temperature of 1200°-1600° C and maintained at a pressure of 150 -250 kg/cm² for at least one hour. The pressure is then released and the so-heat treated material is hot pressed under the following conditions:

| | |
|---|---|
| Temperature: | 1700 – 1900° C |
| Pressure: | 200 – 350 kg/cm² |
| Pressing time: | 5 – 120 minutes |

The hot pressed beta-alumina made by above steps is cut to form solid electrolyte pellets or elements having appropriate sizes.

These elements are further treated at a temperature of about 1600° C for at least 2 hours before cooling and assembling into cells.

The invention can be modified within the range which does not constitute deperture from the spirit and scope of the invention as set forth in the appended claims.

What is claimed:

1. A solid electrolyte cell comprising, and anodic-active material, a cathodic-active material and a solid $\beta$-alumina electrolyte juxtaposed therebetween and in contact therewith, wherein said cathodic-active material is a compound of the class having water of crystallization included therein.

2. The cell according to claim 1 wherein the areas of contact between said electrolyte and said cathodic active material is suffused with an aqueous solution of an inorganic acid.

3. The cell according to claim 2 wherein said contact areas are abraded before suffusion with said acidic solution.

4. The cell according to claim 1 wherein said cathodic material containing water of crystallization is at least one copper salt having a water of crystallization.

5. The cell according to claim 3 wherein said copper salts are selected from group consisting of the trihydric and pentahydric copper sulfates.

6. The cell according to claim 1 wherein said cathodic active material has admixed thereto an electrically conductive material inert to the electrolytic reactions of said cell.

* * * * *